United States Patent [19]

Shoji et al.

[11] Patent Number: 4,825,309
[45] Date of Patent: Apr. 25, 1989

[54] CIRCUIT ARRANGEMENT FOR THE SELECTIVE SUPPRESSION AND NONSUPPRESSION OF READ OUTPUT IN MAGNETIC DISK APPARATUS

[75] Inventors: Makoto Shoji, Akigawa; Katsuya Enami, Houya, both of Japan

[73] Assignee: Teac Corporation, Tokyo, Japan

[21] Appl. No.: 119,158

[22] Filed: Nov. 10, 1987

[30] Foreign Application Priority Data

Nov. 12, 1986 [JP] Japan .................... 61-269148

[51] Int. Cl.⁴ .................... G11B 5/02; G11B 21/08
[52] U.S. Cl. .................... 360/60; 360/78.13
[58] Field of Search .................... 360/60, 62, 67, 68, 360/78

[56] References Cited

U.S. PATENT DOCUMENTS

4,688,112  8/1987  Shoji et al. .................... 360/60
4,777,545  10/1988  Shoji et al. .................... 360/78

Primary Examiner—Vincent P. Canney
Attorney, Agent, or Firm—Woodcock Washburn Kurtz Mackiewicz & Norris

[57] ABSTRACT

A control system for a disk drive operating under the control of a host system for data transfer with a magnetic disk medium. The host system provides a signal indicative of whether the disk drive is in operation in a read-only mode or in a write-only or read-and-write mode. During operation in the write-only and read-and-write modes, the control system inhibits the delivery to the host system of both read data and index pulses during, for example, a disk start-up time, and access time and a transducer loading time, because the data recovered from the disk medium during such times may be inaccurate, inviting inaccurate writing. However, during operation in the read-only mode, the control system constantly permits the delivery of read data and index pulses to the host system with a view to the curtailment of the average read access time.

8 Claims, 4 Drawing Sheets

CIRCUIT ARRANGEMENT FOR THE SELECTIVE SUPPRESSION AND NONSUPPRESSION OF READ OUTPUT IN MAGNETIC DISK APPARATUS

BACKGROUND OF THE INVENTION

Our invention relates generally to apparatus for data transfer with record media such as, typically, flexible magnetic disks having a series of concentric data storage tracks on its surface. More specifically, our invention has to do with an electric control system for use in or with such magnetic disk apparatus, known also as a disk drive, for assuring the accurate writing on, and quick reading from, the disk medium. The invention may be considered an improvement of the disk drive control system suggested by Shoji et al. U.S. patent application Ser. No. 924,053 field Oct. 28, 1986.

In the flexible magnetic disk drive art in general, a stepper motor capable of rotation in short and essentially uniform angular movements is employed in combination with a motion translating mechanism such as a lead screw for transporting a transducer or transducers radially of the disk medium from track to track thereon. Stepped from one track to another, the transducer or transducers normally do not come to an immediate stop thereon but will oscillate or vibrate for some time before resting stably. We will refer to the time required for the travel of the transducer from one track to another as the "traveling time", and to the time during which the transducer oscillates or is otherwise unstable on the new track as the "settling time". The sum of the "traveling time" and the "settling time" is what we call "access time".

Should writing be commenced during the "settling time", that is, before the end of the "access time", then the written data might not subsequently be read correctly. The instruction manuals of some commercial disk drive models warn the user of this danger. However, this warning is to no effect in some instances.

Customarily, the disk drive is not self-contained; it is a slave unit under the control of a host system typically comprising a central processor unit and a disk drive controller. The host system may be conventionally programmed to commence writing immediately upon reception of the identification data on the magnetic disk from the disk drive. If the identification data is read and fed to the host system during the "access time", writing will start when the transducer is not yet stably positioned on the new track, resulting in the difficulties pointed out previously.

An attempted solution to this problem is found in the above cross-referenced Shoji et al. application Ser. No. 924,053. This prior application suggests the suppression of any identification data that may be read during the "settling time", as well as of the index pulses generated during the "access time". Accordingly, since the host system receives the identification data and index pulses only after the transducer has been stabilized on each new track, writing cannot possibly be started before the end of the "access time."

We have found the above solution unsatisfactory. Purely from the standpoint of accurate writing, the "settling time" and, therefore, the complete "access time" should be preset long enough to preclude the possibility of the incorrect reading of the identification data. The problem is that such long "access time" setting is an advantage from a viewpoint of accurate writing only and is a weakness from that of quick reading.

This is because, according to the noted prior application, the read data output is suppressed during the "access time" not only in the write mode but also in the read mode. If the "access time" is determined long enough for the purpose of accurate writing, the possibility arises that data may be read correctly toward the end of each access time. The suppression of such possibly correctly read data during operation in the read mode runs counter to the objective of quick commencement of reading.

SUMMARY OF THE INVENTION

We have hereby discovered how to realize the self-contradictory objective of accurate writing and quick reading in data transfer apparatus of the type defined.

Briefly, our invention may be summarized as an apparatus for data transfer with a disklike record medium such as a flexible magnetic disk, particularly featuring the provision of means for supplying a read-only mode signal indicative of whether the apparatus is in operation in a read-only mode or in a write-only or read-and-write mode. The apparatus further comprises a transducer for reading and writing data from and on the record medium, a read/write circuit connected to the transducer for producing read data in response to an output therefrom during reading and for causing the transducer to write desired data on the record medium, and transducer positioning means for stepping the transducer from track to track on the record medium in response to a stepping signal. Also responsive to the stepping signal is a time setting circuit which determines the "access time" to be elapsed from the moment the transducer starts traveling from one track to another on the record medium in response to the stepping signal to the moment the transducer becomes stably positioned on the new track. A read data suppressor circuit is connected to the read/write circuit and the time setting circuit and further responds to the read-only mode signal for suppressing, when the apparatus is in operation in the write-only or read-and-write mode, the read data put out by the read/write circuit during the access time. The read data suppressor circuit constantly permits the read data to pass unsuppressed therethrough when the apparatus is in operation in the read-only mode.

In a preferred embodiment to be presented subsequently, the data transfer apparatus is shown as a magnetic disk drive interfaced with a host system. As is conventional in the art, this host system controls the disk drive by inputting read data and index pulses therefrom. In accordance with our invention, the host system is provided with an additional output for providing the read-only mode signal indicative of whether the disk drive is in the write-only (formatting) or read-and-write (normal writing) mode or in the read-only (normal reading) mode.

When the disk drive is operating in the write-only or read-and-write mode, the read data and, preferably, index pulses as well are suppressed and not delivered to the host system during each access time in order to prevent erroneous writing. The read data and index pulses may additionally be prevented from delivery to the host system during other appropriate periods of operation in the write-only or read-and-write mode, as when the disk medium is just set into rotation and is picking up speed, and when the transducer is just loaded against the disk medium and is unstable thereon.

However, when the disk drive is operating in the read-only mode, the read data as well as the index pulses is constantly fed to the host system with a view to quick start of reading. The read data fed to the host system during the unstable periods may, or may not, contain errors. The delivery of such possibly erroneous read data to the host system will present no problem in practice because the host system is usually capable of finding such errors and re-reading the disk. Despite the need for re-reading as required, the average read access time can be cut short by the constant delivery of the read data to the host system during operation in the read-only mode.

The above and other features and advantages of our invention and the manner of realizing them will become more apparent, and the invention itself will best be understood, from a study of the following description and appended claims, with reference had to the attached drawings showing some preferable embodiments of the invention.

BRIEF DESCRIPTION OF THE DRAWINGS

FIGS. 2A through K is a diagram showing in proper time relationship the signals appearing in the various parts of the FIG. 1 circuitry when the disk drive is in operation in the write-only or read-and-write mode;

FIGS. 3A through K is a similar diagram showing the same signals when the disk drive is in operation in the read-only mode;

DESCRIPTION OF THE PREFERRED EMBODIMENTS

Figure 1:
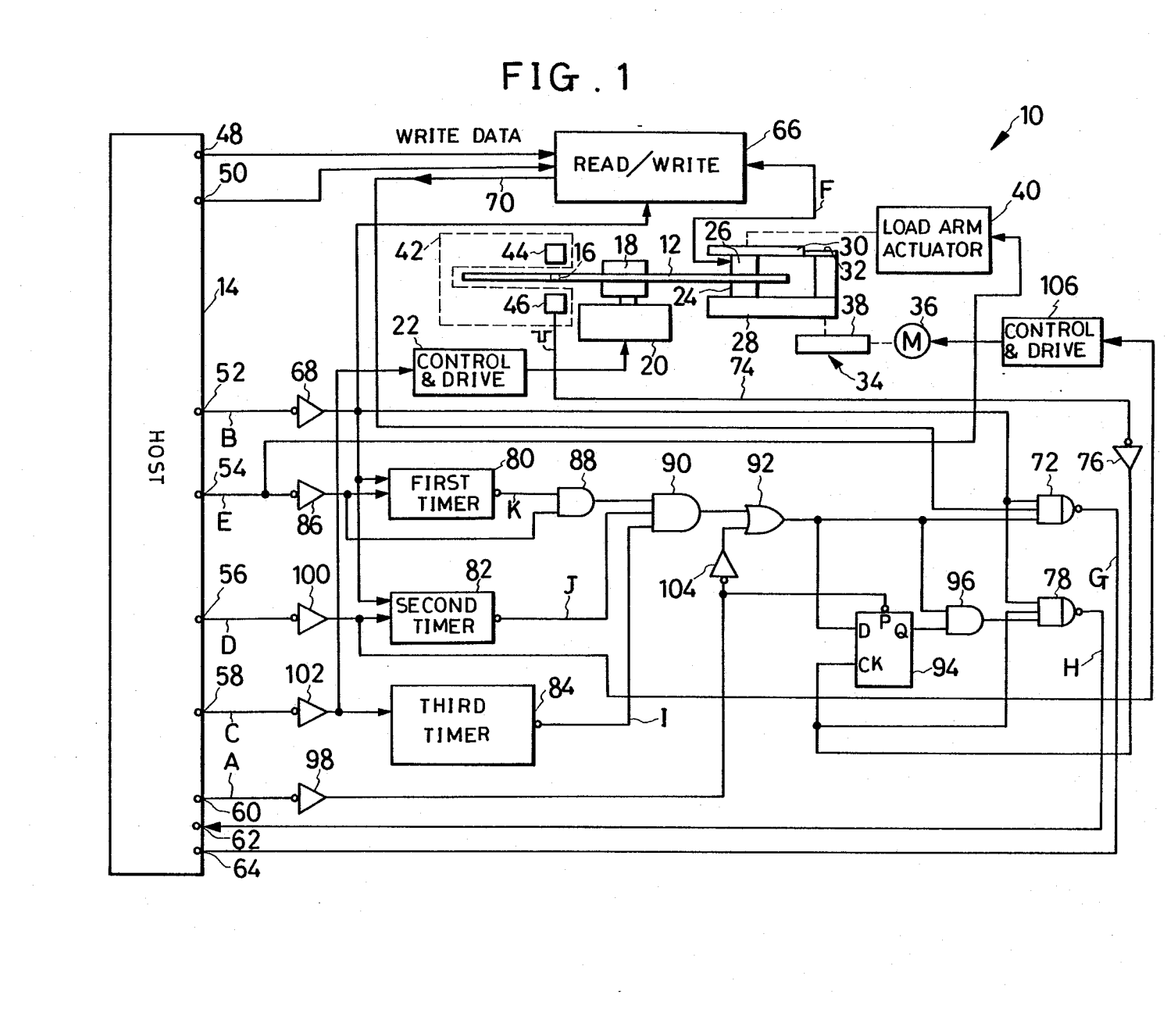
FIG. 1 is a block diagram of the circuitry of the disk drive incorporating the principles of our invention, shown together with some pertinent mechanical parts or components of the disk drive, and with the host system controlling the disk drive.

We have illustrated in FIG. 1 a typical form of the mechanical and electronic configurations of a data transfer apparatus or disk drive 10, together with a flexible magnetic disk 12 mounted in position therein, in accordance with our invention. Mechanically, the disk drive 10 is shown only insofar as is necessary for a full understanding of our invention. FIG. 1 also shows a host system 14 controlling the disk drive 10, even though in practice the latter may, or may not, be integrally united with such host system. Also, as is quite conventional in the art, two or more disk drives of identical make may be jointly controlled by the host system 14.

The flexible magnetic disk 12 can be of the familiar type disclosed, for example, in Castrodale et al. U.S. Pat. No. 4,089,029. Actually, as taught by Castrodale et al., the magnetic disk 14 is normally enclosed in a protective envelope or jacket to make up a disk cartridge. We have disregarded the envelope in the showing of FIG. 1 as it bears no particular pertinence to our present invention. The magnetic disk 12 has a series of concentric magnetic tracks on one or both sides thereof, the outermost one of the tracks being usually referred to as Track Zero. We assume, purely by way of example, that the magnetic disk 12 is double sided, having the tracks on both sides thereof. An index mark, herein shown as a hole 16, is formed eccentrically in the magnetic disk 12 for purposes yet to be described.

A clamp assembly 18 releasably fastens the magnetic disk 12 to a disk drive motor 20. Electrically coupled to the disk drive motor 20, a motor control and drive circuit 22 controllably energizes the motor 20, causing the same to rotate the magnetic disk 12 together with the clamp assembly 18 in a predetermined direction and at a predetermined speed.

First 24 and second 26 electromagnetic transducers or read/write heads of essentially identical design are disposed on the opposite sides of the magnetic disk 12 for data transfer contact therewith. The first transducer 24 is mounted directly to a carriage 28 which is constrained to linear travel in a radial direction of the magnetic disk 12. The second transducer 26 is mounted to the carriage 28 via a load arm 30 which is pivoted thereon via a cantilever spring 32. The carriage 28 with the load arm 30 thereon constitutes a part of a transducer-positioning mechanism 34 which functions to transport the transducers 24 and 26 from track to track on the magnetic disk 12. The positioning mechanism 34 further comprises a positioning motor 36 which in practice can be an electric stepper motor capable of bidirectional rotaion in short and essentially uniform increments. The stepper motor 36 is coupled to the carriage 28 via a motion translating mechanism 38 shown in block form because of its conventional and well known nature. In practice the motion translating mechanism 38 may comprise a lead screw or steel belt for translating the bi-directional, incremental rotation of the stepper motor 36 into the linear stepwise reciprocation of the carriage.

The load arm 30 on the carriage 28 is pivotable for moving the second transducer 26 into and out of data transfer engagement with one side of the magnetic disk 12. Although the cantilever spring 32 itself is normally biased to urge the second second transducer 26 toward the magnetic disk 12, an additional loading spring, not shown, is usually employed for loading the second transducer 26 against the magnetic disk 12 and hence for holding both transducers 24 and 26 in proper data transfer contact with the disk. A load arm actuator 40 normally takes the form of a solenoid which is operatively coupled to the load arm 30 for controlling such pivotal motion of the load arm toward and away from the magnetic disk 12.

For detecting the index hole 16 in the magnetic disk 12 there is provided an index sensor 42 of familiar design comprising a light source 44 and a photodetector 46 disposed opposite each other across the magnetic disk 12. The light source 44 may take the form of a light-emitting diode, and the photodetector 46 a phototransistor. The index sensor 42 optically detects the index hole 16 in the magnetic disk 12 and puts out index pulses indicative of the rotational speed and angular position of the magnetic disk.

Having thus briefly studied the mechanics of the disk drive 10, we will now proceed to the description of the electronic control system therefor in conjunction with the host system 14. Conventionally comprised of a central processor unit and a disk drive controller, the host system 14 is interfaced with the disk drive 10 via a WRITE DATA output 48, WRITE GATE output 50, DRIVE SELECT output 52, TRANSDUCER LOAD output 54, STEP output 56, MOTOR ON output 58, READ-ONLY MODE output 60 in accordance with our invention, INDEX input 62, and READ DATA input 64. Actually, the host system 14 is conventionally furnished with many more terminals for full control of the disk drive or drives 10. We have not shown such additional terminals because they have no direct relevance to our invention.

The pair of transducers 24 and 26 are both connected to a read/write circuit 66 which operates under the control of the host system 14 for causing the transducers to write on, and read from, the magnetic disk 12. The WRITE DATA output 48 and WRITE GATE output 50 of the host system 14 are both connected directly to the read/write circuit 66, whereas the DRIVE SELECT output 52 is connected thereto via a NOT circuit 68. A READ DATA line 70 from the read/write circuit 66 is connected to the READ DATA input 64 of the host system 14 via a NAND gate 72, so that not all the read data put out by the read/write circuit is fed to the host system 14.

The index sensor 42 has its output line 74 coupled to the INDEX input 62 of the host system 14 via a NOT circuit 76 and three-input NAND gate 78. Accordingly, the index pulses from the index sensor 42 are selectively suppressed by the NAND gate 78 before reaching the host system 14.

We have employed first 80, second 82 and third 84 timers for the production of signals for the selective suppression of the read data and index pulses. The first timer 80 has two inputs, one coupled to the DRIVE SELECT output 52 of the host system 14 via the NOT circuit 68, and the other to the TRANSDUCER LOAD output 54 of the host system via another NOT circuit 86. When triggered, the first timer 80 puts out a "negative" pulse the duration of which is approximately equal to the "transducer loading time", by which we mean the time required for the transducers 24 and 26 on being loaded against the magnetic disk 12 to become stabilized thereon. The output of the first timer 80 is connected to one of the two inputs of an AND gate 88, the other input of which is connected to the TRANSDUCER LOAD output 54 of the host system 14 via the NOT circuit 86. Thus the AND gate 88 produces a low output during the sum of the time during which the transducers 24 and 26 are unloaded (hereinafter referred to as the "transducer unload time"), and the "transducer loading time".

Some known disk drives do not employ a solenoid for loading the transducer or transducers on the disk medium. In such cases we suggest the use of a signal indicative of the ejection of the disk medium from the disk drive, in substitution for the TRANSDUCER LOAD signal from the host system 14. As far as the purposes of our invention are concerned, such an eject signal can be considered essentially equivalent to the TRANSDUCER LOAD signal since the transducers are not loaded when the disk medium is unloaded from the apparatus.

The output of the AND gate 88 is connected to a three-input AND gate 90, the output of which is connected in turn to the NAND gate 72 via a two-input OR gate 92. The output of the OR gate 92 is further connected both to the data input D of a D flip flop 94 and to a two-input AND gate 96. The flip flop 94 has a clock input CK connected to the index sensor 42 via the NOT circuit 76, and a preset input P connected to the READ-ONLY MODE output 60 of the host system 14 via a NOT circuit 98. The Q output of the flop flop 94 is connected to the AND gate 96, the output of which is connected to the NAND gate 78.

The second timer 82 has two inputs, one connected to the DRIVE SELECT output 52 of the host system 14 via the NOT circuit 68, and the other to the STEP output 56 of the host system via a NOT circuit 100. The output of the second timer 82 is connected to the aforesaid three-input AND gate 90. The second timer 82 when triggered puts out a "negative" pulse having a duration equal to the "access time" (sum of the "traveling time" and "settling time") of the transducers 24 and 26.

The third timer 84 has its single input connected to the MOTOR ON output 58 of the host system 14 via a NOT circuit 102. The output of the third timer 84 is connected to the three-input AND gate 90. When triggered by the MOTOR ON signal, the third timer 84 puts out a "negative" pulse having a duration approximately equal to the "disk start-up time", that is, the time required for the disk drive motor 20 to attain a predetermined constant speed of rotation in response to the MOTOR ON signal and hence to make the magnetic disk 12 ready for the commencement of data transfer with the transducers 24 and 26.

Besides being connected to the preset input P of the flip flop 94 via the NOT circuit 98 as aforesaid, the READ-ONLY MODE output 60 of the host system 14 is coupled to the OR gate 92 via an additional NOT circuit 104.

The DRIVE SELECT output 52 of the host system 14 is connected to both three-input NAND gates 72 and 78 via the NOT circuit 68. The TRANSDUCER LOAD output 54 of the host system is connected directly to the load arm actuator 40, besides being connected to the NOT circuit 86. The STEP output 56 of the host system is connected via the NOT circuit 100 not only to the second timer 82 but also to a stepper motor control and drive circuit 106. Fed with stepping pulses from the host system 14 the control and drive circuit 106 controllably energizes the stepper motor 36, causing the transducers 24 and 26 to travel radially of the magnetic disk 12 to an extent determined by the number of the stepping pulses input to the circuit 106. The MOTOR ON output 58 of the host system is connected via the NOT circuit 102 to the drive drive motor control and drive circuit 22, besides being connected to the third timer 84.

OPERATION

Figure 2:
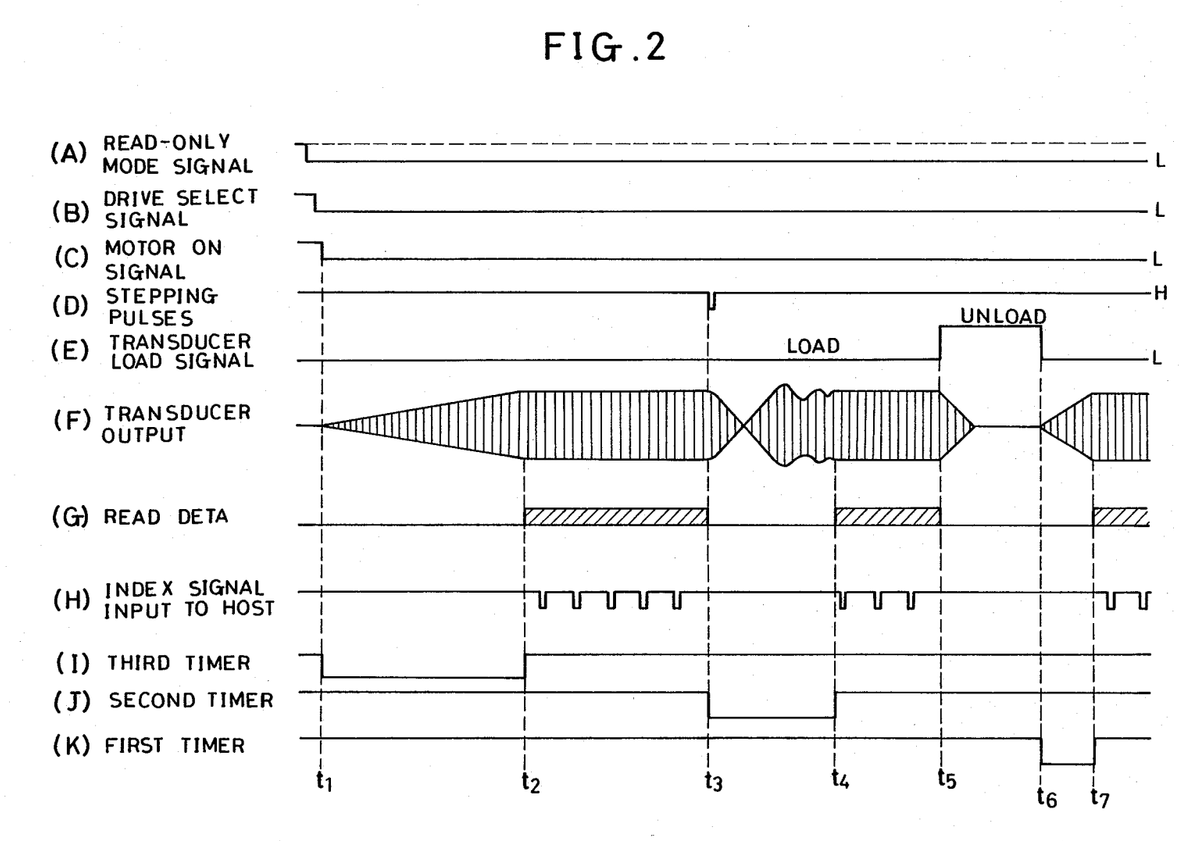
Figure 3:
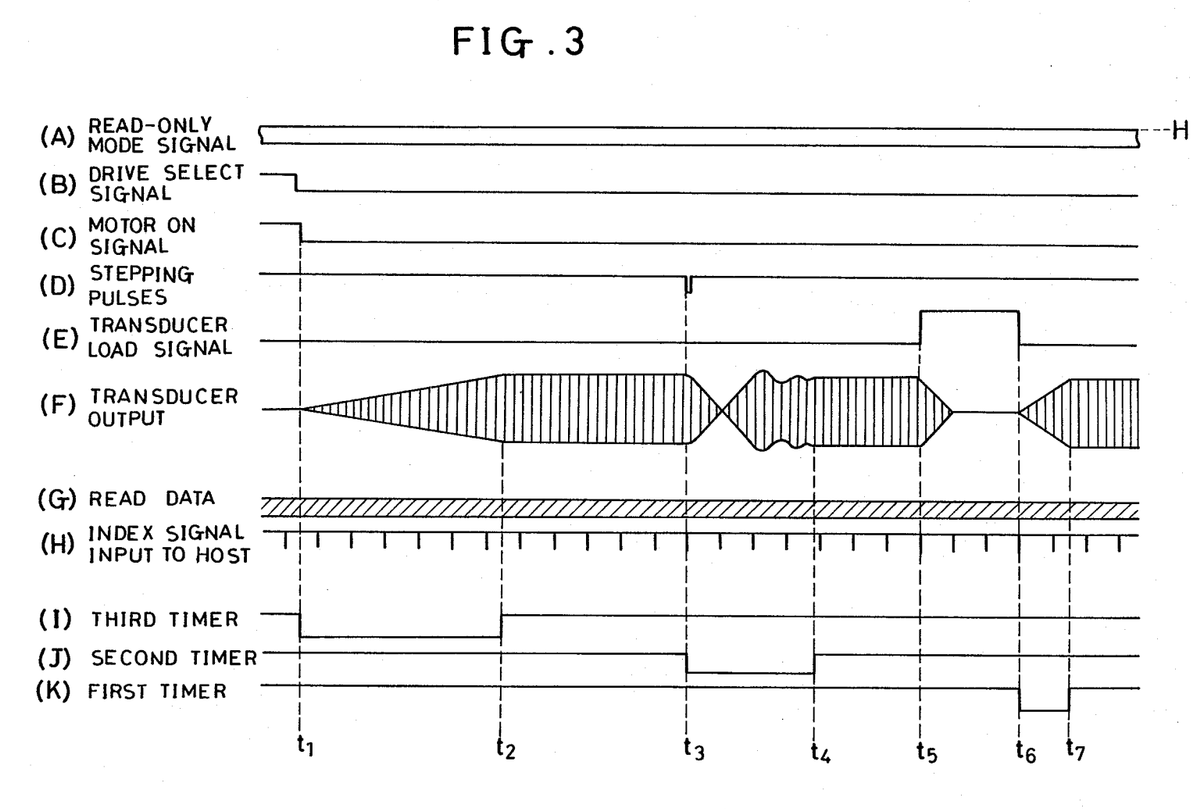

In the course of the subsequent operational description of the disk drive 10 in conjunction with the host system 14, we will refer also to FIGS. 2 and 3 successively, which depict at (A) through (K) the signals useful in explaining the operation of the FIG. 1 system. We have indicated in FIG. 1 the parts where the signals (A) through (K) of FIGS. 2 and 3 appear, by the same capitals.

As will be noted from (A) in both FIGS. 2 and 3, the READ-ONLY MODE signal, supplied from the READ-ONLY MODE output 60 of the host system 14 in accordance with the novel concepts of our invention, is low in FIG. 2 and high in FIG. 3. The DRIVE SELECT signal from the host output 52 is low in both FIGS. 2 and 3, meaning that the illustrated disk drive 10 is tied to the host system 14 in both cases. The other signals of FIG. 2 are plotted on the assumption that the READ-ONLY MODE signal is low, and the other signals of FIG. 3 on the assumption that the READ-ONLY MODE signal is high. The high state of the READ-ONLY MODE signal indicates that the disk drive is in the read-only mode, in which the transducers 24 and 26 read the magnetic disk 12, with no writing operation involved. The low state of the READ-ONLY MODE signal represents, then, that the disk drive 10 is not in the read-only mode, that is, either in the write-only mode or in the read-and-write mode, as will be explained in more detail hereafter.

Figure 4:
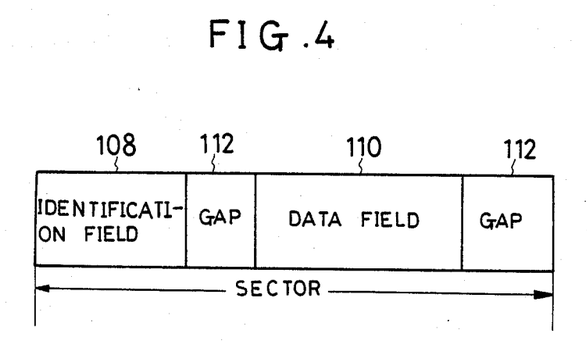
FIG. 4 is a diagram showing one sector of track format on the disk medium for use with the FIG. 1 apparatus.

As is customary in the art, each side of the magnetic disk 12 has many notional sectors on which, as shown in FIG. 4, there are arranged identification fields 108 and data fields 110, with intervening gaps 112, in accordance with a prescribed format. The disk drive 10 is in the write-only mode (READ-ONLY MODE signal low) when the format data is being written on the magnetic disk 12 as in FIG. 4 for disk initialization. The disk drive 10 is in the read-and-write mode (READ-ONLY MODE signal also low) when, in the subsequent use of the magnetic disk 12, data is being written on the successive data fields 110 after reading the prewritten identification data on the identification field 108.

Thus, with reference back to FIG. 2, the READ-ONLY MODE signal from the host output 60 is low as at (A) in this figure when the disk drive 10 is to operate either in the write-only mode or in the read-and-write mode. The MOTOR ON signal from the host output 58 is shown to go low at a moment t1, as at (C) in FIG. 2. Fed via the NOT circuit 102 into the control and drive circuit 22, the MOTOR ON signal will cause the same to set the disk drive motor 20 into rotation together with the magnetic disk 12 clamped to the motor output shaft. As will be noted from (E) in FIG. 2, the TRANSDUCER LOAD signal from the host output 54 has already been low at the moment t1 in this particular embodiment, so that the transducers 24 and 26 have both been loaded against the magnetic disk 12. Consequently, as the magnetic disk 12 gradually picks up speed after the moment t1, the analog (non-data) output from each of the transducers 24 and 26 will increase correspondingly, as represented schematically at (F) in FIG. 2.

As indicated at (I) in FIG. 2, the output from the third timer 84 will go low at the moment t1 in response to the MOTOR ON signal and remain so until the moment t2 when the rotational speed of the magnetic disk 12 becomes sufficiently high for data transfer in the write-only or read-and-write mode. Consequently, during the time interval t1-t2, which we have defined as the "disk start-up time", the output from the AND gate 90 is low, and so is the output from the OR gate 92. Impressed to the three-input NAND gate 72, the low output from the OR gate 92 serves to inhibit the delivery of the read data from the read/write circuit 66 on to the host system 14 from moment t1 to moment t2, as indicated at (G) in FIG. 2.

Further, during this "disk start-up time" t1-t2, the low output from the OR gate 40 is also impressed to the AND gate 96. The resulting low output from this AND gate 96 causes the other three-input NAND gate 78 to inhibit the delivery of index pulses from the index sensor 42 on to the host system 14, as will be seen from (H) in FIG. 2. The host system 14 is conventionally programmed to control writing in response to the index pulses. Therefore, as no index pulses are input to the host system 14 from moment t1 to moment t2, there is no possibility of data being written on the magnetic disk 12 during this "disk start-up time".

The impression of the low output from the OR gate 92 to the NAND gate 78 will suffice to achieve the objective of index pulse suppression. However, in this embodiment, the provision of the D flip flop 94 is essential in order to prevent the delivery of inaccurate index pulses from the disk drive 10 to the host system 14. We will discuss hereafter why the flip flop 94 is needed toward this end.

The host system 14 responds to the leading edges of the index pulses for producing the write gate and other control signals. It is therefore essential that the leading edges of the index pulses be in precise time relation to the angular position of the index hole 16 in the magnetic disk 12 with respect to the fixed location of the index sensor 42. With this desired time relation understood, let us suppose that the D flip flop 94 is absent from the control system of FIG. 1. In that case, should an index pulse be produced which rose before the moment t2 in FIG. 2 and which decayed after that moment, only a leading edge portion of this index pulse would be suppressed by the NAND gate 78 as the low output from the third timer 84, lasting to the moment t2 as at (I) in FIG. 2, was also impressed to the NAND gate 78. So delivered to the host system 14, the resulting shorter duration index pulse would not represent by its leading edge the exact angular position of the index hole 16 in the magnetic disk 12.

The D flip flop 94 serves to preclude the above stated possibility. Having its clock input CK connected to the index sensor 42 and its data input D to the OR gate 92, the flip flop 94 takes in the OR gate output when actuated by the leading edge of each incoming index pulse. Accordingly, the Q output from the flip flop 94 will remain low upon reception of an index pulse that starts before the moment t2, even if the index pulse terminates after this moment. The flip flop 94 will go high upon reception of the next index pulse which is generated after the moment t2. Thus the passage of the index pulses through the NAND gate 78 depends not only upon the output state of the OR gate 92 but also on that of the flip flop 94, with the result that only those index pulses which accurately represent the angular position of the magnetic disk 12 are supplied to the host system 14.

It will be noted that the preset input P of the flip flop 94 is connected to the READ-ONLY MODE output 60 of the host system 14 via the NOT circuit 98. Therefore, when the READ-ONLY MODE signal is low as in FIG. 2, the preset input P of the flip flop 94 is high, enabling the same to respond to the index pulses fed to its clock input CK.

As the third timer 84 goes high upon lapse of the "disk start-up time" at the moment t2, both the read data such as the identification data and the index pulses will be supplied to the host system 14 via the NAND gates 72 and 78, respectively, as indicated at (G) and (H) in FIG. 2. Then the host system 14 will control the disk drive 10 for writing desired data on the magnetic disk 12 in accordance with the program that has been introduced into the host system. The host system 14 may be programmed to start writing immediately upon reading the identification data on the magnetic disk 12. In that case, desired data will be written immediately after the identification data has been supplied to the host system 14 after the moment t2. Since there is no possibility of the identification data being fed to the host system 14 from moment t1 to moment t2 in accordance with our invention, no writing will take place during this disk start-up period.

At (D) in FIG. 2 is shown a "negative" stepping pulse supplied from the STEP output 56 of the host system 14. Inverted by the NOT circuit 100, the stepping pulse will be fed directly to the stepper motor control and drive circuit 106 thereby causing the stepper motor 36 to step the transducers 24 and 26. The stepping pulse is also applied to the second timer 82, which in practice can be a retriggerable monostable multivibrator. The second timer 82 on being so triggered will put out a "negative" pulse lasting from moment t3 moment t4, as represented at (J) in FIG. 2. The time interval t3-t4 is the noted "access time" of the transducers 24 and 26 to the desired new track on the magnetic disk 12. Contrary to the showing of FIG. 2(D), a series of stepping pulses may be generated for stepping the transducers 24 and 26. In that case, being a retriggerable monostable multivibrator, the second timer 82 will produce the constant duration pulse in response to the last of the series of stepping pulses.

Like the third timer 84, the second timer 82 has its output connected to the AND gate 90. It will therefore be seen that the two three-input NAND gates 72 and 78 function just as in the time interval t1-t2 to inhibit the delivery of the read data and index pulses to the host system 14 during the time interval t3-t4. Both read data and index pulses will be fed to the host system 14 after the moment t4 when the transducers 24 and 26 become stably positioned on the new track.

At (E) in FIG. 2 the TRANSDUCER LOAD signal from the host output 54 is shown to go high at a moment t5 following the moment t4. Impressed directly to the load arm actuator 40, the high TRANSDUCER LOAD signal will cause the transducers 24 and 26 to move out of data transfer contact with the magnetic disk 12. The transducers 24 and 26 will be reloaded against the magnetic disk 12 as the TRANSDUCER LOAD signal goes low at a subsequent moment t6. The time interval t5-t6 is what we call the "transducer unload time".

Triggered by the trailing edge of the high state of the TRANSDUCER LOAD signal at the end t6 of the "transducer unload time", the first timer 80 will put out a "negative" pulse until a subsequent moment t7. We have previously defined the time interval t6-t7, spanned by the low output from the first timer 80, as the "transducer loading time". The low output from the first timer 80 is applied to the AND gate 88, to which is also impressed the inversion of the TRANSDUCER LOAD signal given at (E) in FIG. 2. Consequently, the output from the AND gate 88 will remain low from moment t5 to moment t7, that is, during the sum of the "transducer unload time" (t5-t6) and the "transducer loading time" (t6-t7). The AND gate 88 has its output connected to the three-input AND gate 90, the other two inputs of which are connected to the second and third timers 82 and 84. It will therefore be apparent that both read data and index pulses are not supplied to the host system 14 during the time interval t5-t7, either.

Thus, during operation in the write-only or write-and-read mode, the delivery of both read data and index pulses to the host system is automatically inhibited during the time intervals t1-t2, t3-t4, and t5-t7, when inaccurate read data may be obtained from the magnetic disk 12 for the reasons set forth previously. As the undisired read data and index pulses are suppressed during such time intervals, there is no danger of the disk drive 10 writing inaccurately on the magnetic disk 12 under the control of the host system 14.

We will now proceed to the discussion of FIG. 3, in which the READ-ONLY MODE signal is shown to be constantly high at (A), indicating that the disk drive 10 is in operation in the read-only mode. Just as in the case of operation in the write-only or write-and-read mode described in the foregoing with reference to FIG. 2, the third timer 84, second timer 82 and first timer 80 will successively put out low outputs during the "disk start-up time" t1-t2, "access time" t3-t4, and "transducer loading time" t6-t7, respectively. Consequently, as has also been explained in connection with FIG. 2, the output from the AND gate 90 will be low during all these time intervals t1-t2, t3-t4, and t6-t7, as well as during the "transducer unload time" t5-t6. Although one input to the OR gate 92 is low during all these time intervals, its output will remain high because the high READ-ONLY MODE signal is fed to the other input thereof via the two NOT circuits 98 and 104. The NAND gates 72 and 78 do not suppress the read data and index pulses during the noted time intervals.

Thus, as indicated at (G) and (H) in FIG. 3, the read data and index pulses are constantly fed to the host system 14 during operation in the read-only mode. The index pulses so fed to the host system are used as a time reference for the determination of whether data is prewritten on the magnetic disk or not. If no data is input during the time interval of three consecutive incoming index pulses, the host system will determine that no data is prewritten.

Being connected to the READ-ONLY MODE output 60 of the host system 14 via the NOT circuit 98, the preset input P of the D flip flop 94 constantly receives a low signal during operation in the read-only mode. Accordingly, the flip flop 94 remains set, and its Q output is constantly high.

It will have been noted that the read data is constantly fed to the host system 14 during operation in the read-only mode. Although accurate read data is not obtainable during most of the "disk start-up time" T1-T2, "access time" t3-t4, "transducer unloaded time" t5-t6, and "transducer loading time" t6-t7, some accurate data will in all likelihood be fed to the host system 14 toward the ends of these periods if the durations of the output pulses of the three timers 80, 82 and 84 are determined sufficiently long. Customarily, the host system 14 is constructed and programmed for an "error check" function, accepting errorless data and, upon reception of erroneous data, commanding the disk drive 10 to re-read the disk 12. The delivery to the host system 14 of the accurate data that is likely to be obtained toward the ends of the noted time intervals will contribute substantially to the quick commencement of reading during operation in the read-only mode.

ALTERNATIVE FORM

Figure 5:
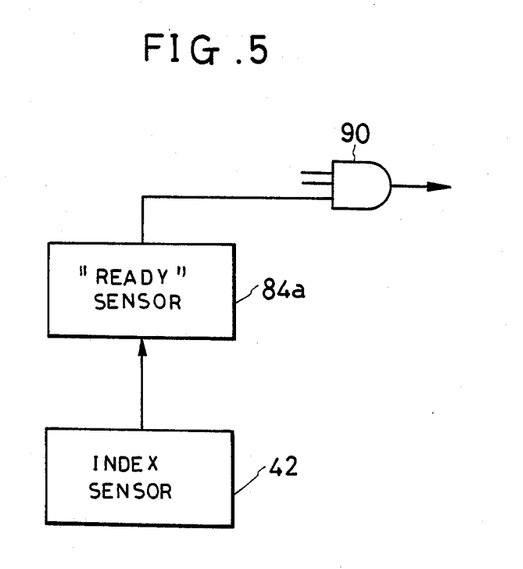
FIG. 5 is a fragmentary block diagram of a slight modification of the FIG. 1 circuitry.

As illustrated in FIG. 5, the third timer 84 used in the FIG. 1 embodiment is replaceable by a "ready" sensor circuit 84a which is conventionally connected to the index sensor 42 in order to determine the fact that the speed of rotation of the magnetic disk has become sufficiently high for the commencement of data transfer. Since the output from the "ready" sensor circuit 84a is low until the disk attains the predetermined speed of rotation, this low output can be supplied to the AND gate 90 in order to prevent the delivery of the read data and index pulses to the host system during the "disk start-up time" of operation in the write-only or read-and-write mode.

POSSIBLE MODIFICATIONS

Although we have shown and described in our invention in terms of but two preferable embodiments thereof, we recognize, of course, that additional embodiments are possible within the broad teaching hereof. The following is a brief list of possible modifications or alterations of the above disclosed embodiments which we believe fall within the scope of our invention:

1. The first timer 80 or third timer 84 or both may be omitted if some other means are employed for inhibiting writing during the "disk start-up time" and/or "transducer loading time".

2. Our invention may be applied to apparatus of the type wherein the transducer or transducers are automatically loaded against the disk medium upon clamping of the latter onto the motor-driven turntable. This type of apparatus does not need the load arm actuator 40; therefore, instead of the TRANSDUCER LOAD signal, the first timer may be triggered by a signal indicative of the insertion and withdrawal of the disk medium into and from the apparatus.

3. The transducers may be moved out of contact with the disk medium while being stepped from one track to another. In this case the TRANSDUCER LOAD signal will go high at the moment t3 in FIGS. 2 and 3, and low when the transducers are positioned on the new track. Of course, the delivery of the read data and index pulses to the host system should be held inhibited until the end of the subsequent "transducer loading time".

4. Our invention may be applied to apparatus for use with magnetic disk media of the class having no index hole formed therein. Such apparatus has, instead, an index mark on the rotor of a disk drive motor or on the motor-driven turntable, the index mark being sensed optically to provide index pulses similar to those produced by the index sensor 42 of the above disclosed embodiment.

5. "Positive" pulses may be used in the various "negative" pulses employed in the illustrated embodiment, with appropriate modifications of the logic circuitry.

What is claimed is:

1. A data transfer apparatus for use with a disklike record medium such as a flexible magnetic disk having data storage tracks thereon, comprising:
    (a) disk drive means for imparting rotation to the record medium;
    (b) a transducer for reading and writing data from and on the record medium;
    (c) a read/write circuit connected to the transducer for producing read data in response to an output therefrom during reading and for causing the transducer to write desired data on the record medium;
    (d) first signal supply means for supplying a stepping signal;
    (e) transducer positioning means connected to the first signal supply means for stepping the transducer from track to track on the record medium in response to the stepping signal;
    (f) a time setting circuit also connected to the first signal supply means for determining an access time to be elapsed from the moment the transducer starts traveling from one track on the record medium to a desired new track thereon in response to the stepping signal to the moment the transducer becomes stably positioned on the new track;
    (g) second signal supply means for suppling a read-only mode signal having a first state dictating the operation of the apparatus in a write-only or read-and-write mode, and a second state dictating the operation of the apparatus in a read-only mode; and
    (h) a read data suppressor circuit connected to the read/write circuit and the time setting circuit and the second signal supply means and operating for suppressing, when the read-only mode signal is in the first state, the read data from the read/write circuit at least during the access time, the read data suppressor circuit constantly permitting the read data to pass unsuppressed therethrough when the read-only mode signal is in the second state.

2. The data transfer apparatus of claim 1 further comprising:
    (a) an index sensor for generating index pulses representative of the rotation and angular position of the record medium; and
    (b) an index pulse suppressor circuit connected to the index sensor and the time setting circuit and the second signal supply means and operating for suppressing, when the read-only mode signal is in the first state, the index pulses generated at least during the access time, the index pulse suppressor circuit constantly permitting the index pulses to pass unsuppressed therethrough when the read-only mode signal is in the second state.

3. The data transfer apparatus of claim 2 wherein the transducer is loaded against the record medium for reading and writing, and wherein the apparatus further comprises:
    (a) third signal supply means for supplying a transducer load signal for controlling the loading and unloading of the transducer with respect to the record medium;
    (b) a second time setting circuit connected to the third signal supply means for determining a loading time to be elapsed from the moment the transducer load signal dictates the loading of the transducer against the record medium to the moment the transducer becomes stabilized thereon;
    (c) the index pulse suppressor circuit being further connected to the third signal supply means and the second time setting circuit for suppressing, only when the read-only mode signal is in the first state, the index pulses generated by the index sensor during a period when the transducer is unloaded from the record medium and during the loading time.

4. The data transfer apparatus of claim 3 wherein the read data suppressor circuit is further connected to the second time setting circuit for suppressing, only when the read-only mode signal is in the first state, the read data from the read/write circuit during the loading time.

5. The data transfer apparatus of claim 2 further comprising:
    (a) third signal supply means for supplying a motor-in signal for the on-off control of the disk drive means;
    (b) a second time setting circuit connected to the third signal supply means for determining a disk start-up time to be elapsed from the moment the motor-on signal dictates the rotation of the record medium to the moment the speed of rotation of the record medium becomes sufficiently high for the commencement of data transfer with the transducer;

(c) the index pulse suppressor circuit being further connected to the second time setting circuit for suppressing, only when the read-only mode signal is in the first state, the index pulses generated by the index sensor during the disk start-up time.

6. The data transfer apparatus of claim 5 wherein the read data suppressor circuit is further connected to the second time setting circuit for suppressing, only when the read-only mode signal is in the first state, the read data from the read/write circuit during the disk start-up time.

7. In combination with a host system capable of supplying a stepping signal and a read-only mode signal, the read-only mode signal having a first state dicating operation in a write-only or read-and-write mode and a second state dictating operation in a read-only mode, a disk drive for use with a disklike record medium such as a flexible magnetic disk having data storage tracks thereon, comprising:
  (a) disk drive means for imparting rotation to the record medium;
  (b) a transducer for reading and writing data from and on the record medium;
  (c) a read/write circuit connected to the transducer for producing read data in response to an output therefrom for delivery to the host system and for causing the transducer to write on the record medium in accordance with write data fed from the host system;
  (d) transducer positioning means responsive to the stepping signal from the host system for stepping the transducer from track to track on the record medium;
  (e) a time setting circuit also responsive to the stepping signal from the host system for determining an access time to be elapsed from the moment the transducer starts traveling from one track on the record medium to a desired new track thereon to the moment the transducer becomes stably positioned on the new track;
  (f) a read data suppressor circuit connected to the read/write circuit and the time setting circuit and being responsive to the read-only mode signal from the host system for inhibiting, when the read-only mode signal is in the first state, the delivery to the host system of the read data produced by the read/write circuit during the access time, the read data suppressor circuit constantly permitting the delivery of the read data to the host system when the read-only mode signal is in the second state;
  (g) an index sensor for generating and delivering to the host system a series of index pulses representative of the rotation and angular position of the record medium; and
  (h) an index pulse suppressor circuit connected to the index sensor and the time setting circuit and being responsive to the read-only mode signal from the host system for inhibiting, when the read-only mode signal is in the first state, the delivery to the host system of the index pulses generated during the access time, the index pulse suppressor circuit constantly permitting the delivery of the index pulses to the host system when the read-only mode signal is in the second state.

8. The invention of claim 7 wherein the transducer is loaded against the record medium for reading and writing, wherein the host system is capable of additionally supplying a transducer load signal for controlling the loading and unloading of the transducer with respect to the record medium, and a motor-on signal for the on-off control of the disk drive means, and wherein the disk drive further comprises:
  (a) a second time setting circuit responsive to the transducer load signal from the host system for determining a loading time to be elapsed from the moment the transducer load signal dictates the loading of the transducer against the record medium to the moment the transducer becomes stabilized thereon;
  (b) the read data suppressor circuit being further connected to the second time setting circuit for inhibiting, only when the read-only mode signal is in the first state, the delivery to the host system of the read data from the read/write circuit during the loading time;
  (c) the index pulse suppressor circuit being also further connected to the second time setting circuit and being responsive to the transducer load signal for inhibiting, only when the read-only mode signal is in the first state, the delivery to the host system of the index pulses generated by the index sensor during a period when the transducer is unloaded from the record medium and during the loading time;
  (d) a third time setting circuit responsive to the motor-on signal from the host system for determining a disk start-up time to be elapsed from the moment the motor-on signal dictates the rotation of the record medium to the moment the speed of rotation of the record medium becomes sufficiently high for the commencement of data transfer with the transducer;
  (e) the read data suppressor circuit being further connected to the third time setting circuit for inhibiting, only when the read-only mode signal is in the first state, the delivery to the host system of the read data from the read/write circuit during the disk start-up time;
  (f) the index pulse suppressor circuit being also further connected to the third time setting circuit for inhibiting, only when the read-only mode signal is in the first state, the delivery to the host system of the index pulses generated by the index sensor during the disk start-up time.

* * * * *